(12) United States Patent
Fatehi et al.

(10) Patent No.: US 10,619,300 B2
(45) Date of Patent: *Apr. 14, 2020

(54) USE OF FLY ASH IN BIOLOGICAL PROCESS OF WASTEWATER TREATMENT SYSTEMS

(71) Applicant: Lakehead University, Thunder Bay (CA)

(72) Inventors: Pedram Fatehi, Thunder Bay (CA); Weijue Gao, Thunder Bay (CA); Germaine Cave, Thunder Bay (CA)

(73) Assignee: Lakehead University, Thunder Bay (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/901,203

(22) Filed: Feb. 21, 2018

(65) Prior Publication Data

US 2019/0024309 A1  Jan. 24, 2019

Related U.S. Application Data

(60) Provisional application No. 62/461,309, filed on Feb. 21, 2017.

(51) Int. Cl.
| | | |
|---|---|---|
| D21C 11/00 | (2006.01) |
| B01J 20/30 | (2006.01) |
| C02F 1/52 | (2006.01) |
| C02F 1/28 | (2006.01) |
| B01J 20/16 | (2006.01) |
| C02F 3/12 | (2006.01) |
| D21C 11/06 | (2006.01) |
| C02F 103/28 | (2006.01) |

(52) U.S. Cl.
CPC ........... *D21C 11/0085* (2013.01); *B01J 20/16* (2013.01); *B01J 20/3071* (2013.01); *C02F 1/281* (2013.01); *C02F 1/5236* (2013.01); *C02F 3/12* (2013.01); *D21C 11/0014* (2013.01); *D21C 11/063* (2013.01); *C02F 3/1263* (2013.01); *C02F 2103/28* (2013.01); *C02F 2301/046* (2013.01)

(58) Field of Classification Search
CPC ...... C02F 1/283; C02F 3/1215; C02F 3/1226; C02F 1/281; C04B 18/106; C04B 18/08; B01D 15/00; B01D 21/00; B01J 20/00; B01J 2220/4887; D21C 11/125
USPC ............................ 210/616, 631, 928; 162/16
See application file for complete search history.

(56) References Cited

U.S. PATENT DOCUMENTS

| | | | | |
|---|---|---|---|---|
| 4,519,921 A * | 5/1985 | Russ | ..................... | C02F 1/5236 210/716 |
| 5,302,288 A * | 4/1994 | Meidl | ..................... | C02F 1/283 210/616 |
| 5,405,502 A * | 4/1995 | Palmu | ..................... | D21C 11/10 162/239 |
| 6,770,168 B1 * | 8/2004 | Stigsson | ................... | D21C 1/06 162/24 |

(Continued)

*Primary Examiner* — Claire A Norris
(74) *Attorney, Agent, or Firm* — Kyle R Satterthwaite; Ryan W Dupuis; Ade & Company Inc.

(57) ABSTRACT

The spent liquor (SL) of a thermomechanical pulping (TMP) process introduces a high load to the wastewater system of this process. To reduce this load, fly ash from a biomass boiler is used and the application of fly ash improves the performance of biological process. Three different alternatives are introduced to apply fly ash to treat spent liquor.

6 Claims, 6 Drawing Sheets

(56) References Cited

U.S. PATENT DOCUMENTS

2011/0143411 A1* 6/2011 Yuan .................. C07G 1/00
435/165

* cited by examiner

# USE OF FLY ASH IN BIOLOGICAL PROCESS OF WASTEWATER TREATMENT SYSTEMS

CROSS REFERENCE TO RELATED APPLICATIONS

This application claims benefit under 35 U.S.C. 119(e) of Provisional Patent Application No. 62/461,309, filed Feb. 21, 2018.

FIELD OF THE INVENTION

The present invention relates generally to pulping processes, and more particularly to the application of fly ash to the spent liquor from such processes.

BACKGROUND OF THE INVENTION

The pulp and paper industry is one of the main industries contributing to the gross domestic products (GDP) of Canada and the USA due to their enormous forest resources (1). However, the pulp and paper industry is currently struggling financially due to strong competition from countries with low labor costs. One strategy to reduce the production costs, and thus to increase the economic benefits of the pulp and paper industry is to utilize their wasted materials more effectively (2,3).

The amount of wastewater generated in the pulp and paper industry was estimated as half of all waste effluents released to surface water in Canada. Recently, the capital cost for a lignocellulosic-based wastewater plant with a hydraulic load of 2.15 MMgal/d was estimated to be $49.4 million and the annual chemical cost for this plant was predicted to be $2.83 million (4).

In the pulping process, cellulose fibers are collected as the main products, but this process generates pulping spent liquors, (SL)s, that contain some organic materials, including lignin and hemicelluloses. This spent liquor is sent to a wastewater treatment plant to remove the suspended solids and dissolved organic materials prior to its discharge. Lignin of SL can be used in the production of value-added products such as carbon fiber, epoxy resins and adhesives. Alternatively, lignin has a heating value of 27 MJ/kg, which equivalently worth $100-300 per oven dry metric ton (2). Possessing such a high heating value would make lignin as a viable alternative fuel.

It has been stated that the main source of chemical oxidation demand (COD) of SL is dissolved lignin and its derivatives (5,6). In this regard, the COD reduction of lignocellulosic-based wastewater effluent was the subject of several research projects (7,8). It has been claimed that, within two stages of anaerobic reactors, 90% of COD from SL was removed at hydraulic retention time of 21 h (9). Although biological methods are efficient in removing COD, the treated wastewater has color, as not all lignocelluloses will decompose by biological treatments. To improve the COD removal from thermomechanical pulping (TMP) wastewater, the co-digestion of lignocelluloses with glucose using thermophilic acidogens was suggested in anaerobic reactors (7). The main disadvantage of such process is the decomposition and thus wasting of the dissolved lignocelluloses in wastewater. In other words, the biological treatment improved the COD removal from wastewater at the expense of decomposing lignocelluloses. Coagulation with metal salts and polymers (mostly anionic) was proposed to improve the removal of lignocelluloses and COD from SL (8). In one study, the aerobic fermentation of effluent of alkaline peroxide mechanical pulping (APMP) with *Aspergillus niger* showed 30% COD reduction via adding 1000 mg/l alum, as a coagulant, and 2 mg/l cationic polyacrylamide (CPAM), as a flocculant (8). In a similar study, almost 90% of COD was removed by adding 4.5 mg/l aluminum sulfate and 2 mg/l CPAM from the secondary treatment of a wastewater effluent (10). Although coagulation and flocculation treatments are more effective than biological processes for removing lignocelluloses and COD, their operating cost is significant.

Adsorption was regarded as a fast, selective and economical method for lignin removal from spent liquors. In one study, a two-stage adsorption process (using activated carbon with the dosage of 1 g activated carbon per 90 g of SL) reduced the lignin, COD and turbidity of SL of TMP by 60%, 32%, 39%, respectively (11). Fly ash is produced in solid fuel boilers by burning wood residuals, bark or coal. In prior literature, the utilization of fly ash for adsorption of NOx, SOx and several organic compounds (i.e. phenols) from wastewater effluents and air was discussed (12). It was stated that up to 90% of lignin was removed from a bleaching effluent of a TMP process by treating with 50 g/l fly ash generated in a steam-producing boiler (13).

The pretreatment of wastewater effluents with various techniques for improving the efficiency of biological treatment has been studied in the past. The electro-fenton pretreatment assisted by poly-aluminum chloride coagulation was found to be highly efficient in removing refractory compounds and improve BOD/COD ratio from 0.1 to near 0.3 (14). Ultrasound pretreatment transformed the molecules to simpler ones, which were further degraded by the microorganisms, and enhanced the biodegradability of the distillery wastewater (15). However, it is not clear how the removal would impact the subsequent biological treatment process.

Applicant has performed studies on the application fly ash to the SL of a TMP process. Of these, an earlier study led to Applicant's co-pending patent applications in Canada and USA, the latter of which was published as US2016/0222, 587, and is incorporated herein by reference in its entirety. The main focus of the earlier study was on the significant performance improvement that the application of fly ash would introduce to effluents prior to the biological treatment of the spent liquor. In further studies, different alternative processes by which fly ash can be applied to the spent liquor or the biological process, and their subsequent effects on the biological treatment processes were evaluated. It is these latter studies with which the present application is concerned.

SUMMARY OF THE INVENTION

According to one aspect of the invention, there is provided a method of treating spent liquor from a pulping process of a pulp mill, including obtaining wastewater from the pulping process that contains both fly ash and said spent liquor, and subjecting said wastewater to biological wastewater treatment while said fly ash and said spent liquor are both present within said wastewater.

A first embodiment involves adding said fly ash to the spent liquor at a wastewater pretreatment stage upstream from the biological wastewater treatment to create pre-treated wastewater containing both said spent liquor and said fly ash, and directing said pre-treated wastewater to the biological wastewater treatment stage without separating said fly ash from the pre-treated wastewater.

The method may comprise mixing the pre-treated wastewater with other untreated wastewater of the mill prior to the subsequent biological treatment of the mixture.

A second embodiment instead involves, prior to adding the fly ash to the spent liquor, making leachate by mixing said fly ash with water, thereby leaching metals from said fly ash before adding said fly ash to the spent liquor.

The second embodiment may include adding said fly ash from which the metals have been leached to the spent liquor for use as an adsorbent in the biological wastewater treatment stage.

Alternatively, the post-treated fly ash can be landfilled or sold off as an adsorbent useable in other processes.

The second embodiment preferably includes mixing the fly ash with water at the leaching stage.

The second embodiment preferably includes administering the leachate to the spent liquor as a coagulant at a coagulation stage upstream of the biological wastewater treatment stage.

The second embodiment preferably includes separating formed coagulates from the spent liquor at a separation stage between the coagulation stage and the biological wastewater treatment stage.

The second embodiment preferably includes using the formed coagulates from the spent liquor as a boiler fuel source, for example at a same boiler of the pulp mill from which the fly ash is originally sourced.

The coagulates are preferably lignocelluloses flocs.

Preferably, the generated flocs form a cake on a filter in the separation stage, and thus are removed from the spent liquor.

Preferably, the generated cake is sent to the boiler and used as a heating source.

In certain embodiments, the spent liquor is sourced from a steam pretreatment stage of a thermomechanical pulping process.

In certain embodiments, the fly ash is obtained from a bark boiler of a thermomechanical pulping process.

Preferably the method includes using resulting sludge from the biological wastewater treatment stage as a boiler fuel source, for example at the same boiler of the pulp mill from which the fly ash is originally sourced.

Preferably fly ash is separated along with the resulting sludge from the biological process.

Preferably the separated sludge/fly ash mixture is sent to the boiler and incinerated.

Preferably the burned fly ash is recycled in the system, for example by reintroduction thereof back into the boiler from which the fly ash was originally sourced.

According to a second embodiment of the present invention, there is provided a method of treating spent liquor from a pulping process of a pulp mill, said method comprising obtaining leachate from a leaching stage at which fly ash from a boiler is subjected to a leaching process removing metal contents therefrom, and applying said leachate to the spent liquor as a coagulant at a pre-treatment stage upstream from a biological wastewater treatment stage to which the pretreated spent liquor is subsequently subjected.

Another aspect of the invention is use of fly ash as an alkali source to treat spent liquor from a pulping process.

Another aspect of the invention is use of leachate of fly ash to reduce lignin content of spent liquor from a pulping process.

Another aspect of the invention is use of leachate of fly ash to reduce a turbidity level of spent liquor from a pulping process.

Another aspect of the invention is use of leachate of fly ash as an alkaline source for the spent liquor.

Another aspect of the invention is use of fly ash in the biological system to improve the chemical oxygen demand, biological oxygen demand, turbidity, solid volume index of biological system.

Another aspect of the invention is use of fly ash to improve the settling ability and dewatering performance of sludge The forgoing methods may be used for reducing any one or more of chemical oxidation demand, lignin content and turbidity of spent liquor from a pulping operation.

DETAILED DESCRIPTION OF PREFERRED EMBODIMENTS

As outlined herein further below, testing by the applicant has demonstrated that the application of the fly ash or its leachate to the spent liquor from a pulping process is effective to reduce the chemical oxygen demand (COD), biological oxygen demand (BOD), total suspended solid (TSS), lignin and sugar contents as well as turbidity level of the spent liquor and/or those of biological treatment processes. This novel application has numerous potential benefits. It has a substantial positive effect on the biological treatment of the spent liquor including a reduction in the sludge volume index SVI), sludge production and thus dewatering and alkali demand in the biological process.

Conventionally, wastewater samples and spent liquors are mixed together and then chemicals, e.g. alkali, are added so that the mixture has the appropriate conditions that are required in the biological treatment of wastewater systems in industry. Acid is produced as a by-product of biological process by the sludge and alkali is used to neutralize the liquor during the biological process. However, since fly ash itself has alkalinity, the novel inclusion of fly ash within the spent liquor at the biological treatment stage (whether introduced upstream or in-situ) will eliminate or reduce the need for alkali to pretreat the spent liquor/effluent mixture prior to the biological treatment and for alkali used during the biological process, thereby reducing chemical costs associated with conventional treatment. As fly ash adsorbs organic compounds, the need for use of other coagulants or flocculants will also be reduced.

Figure 1A:
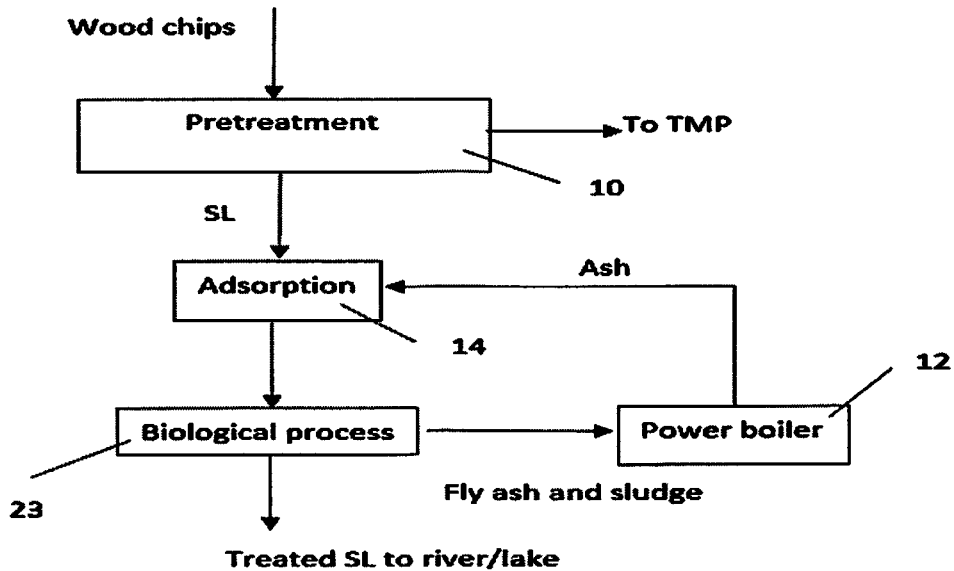
FIG. 1A graphically illustrates a first embodiment process to implement use of fly ash in an aerobic biological wastewater treatment process of a pulp mill.

In a first embodiment schematically shown in FIG. 1A, fly ash is mixed with spent liquor and remains in the spent liquor and enters the biological treatment process. In this case, the fly ash is later removed from the system along with sludge, and incinerated in the boiler and then recirculated back to the incoming stream of spent liquor for another round of treatment.

Figure 1B:
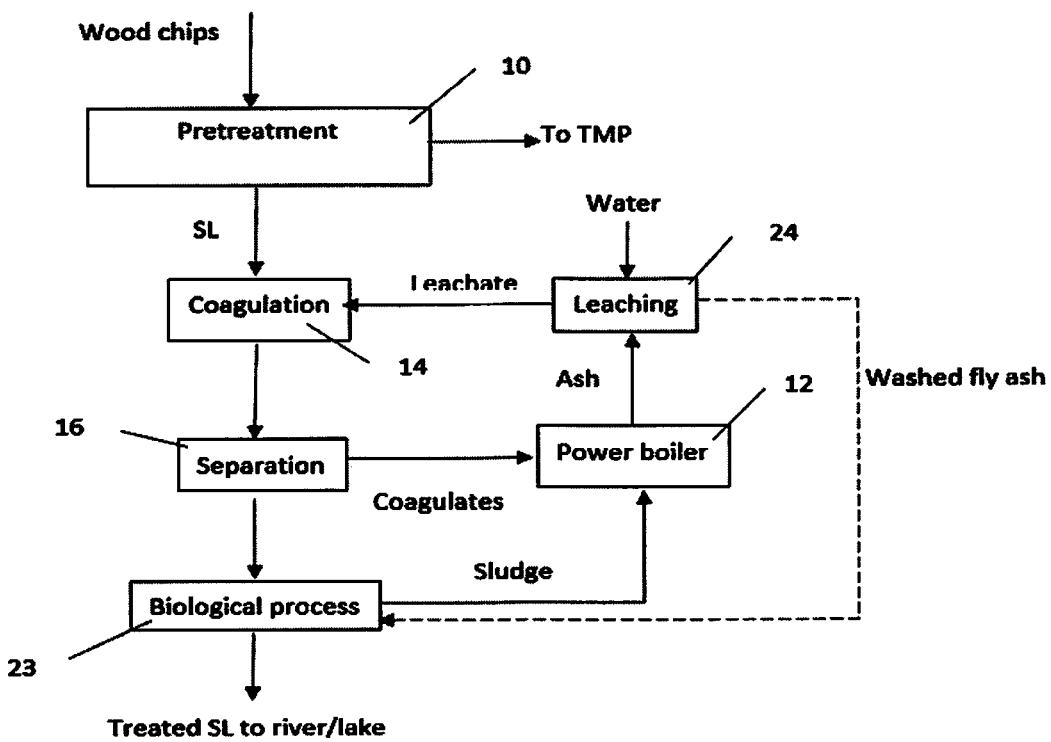
FIG. 1B graphically illustrates a second embodiment process to implement use of fly ash in an aerobic biological wastewater treatment process of a pulp mill.
Figure 2A:
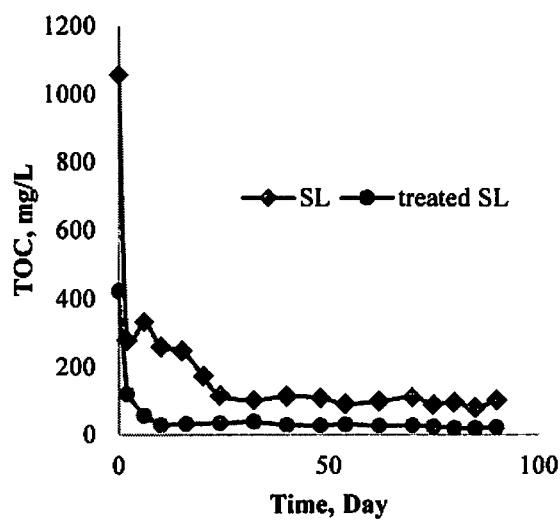
FIGS. 2A-2G graphically illustrate the effect of pretreatment with 6 wt. % fly ash on the biological treatment of spent liquor.
Figure 2B:
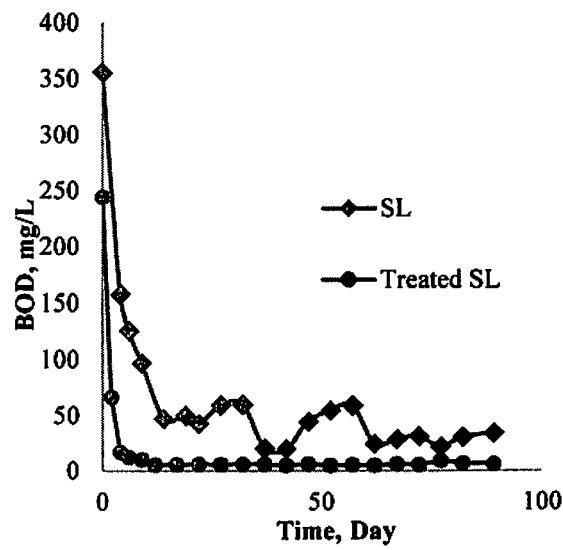
Figure 2C:
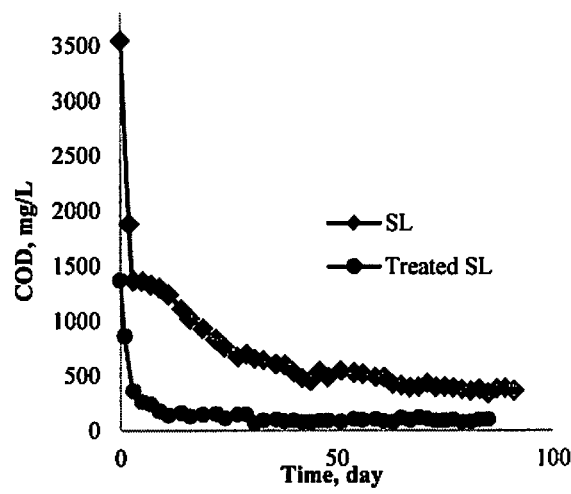
Figure 2D:
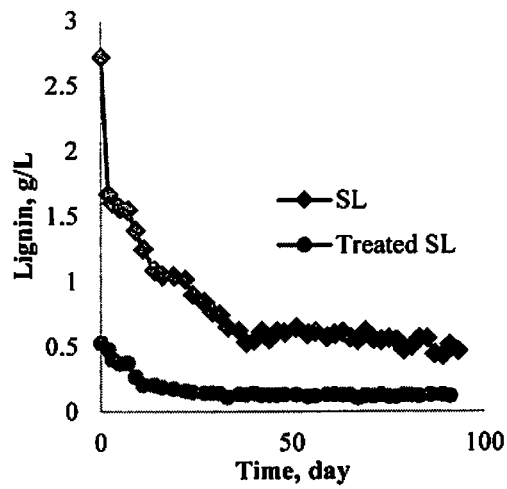
Figure 2E:
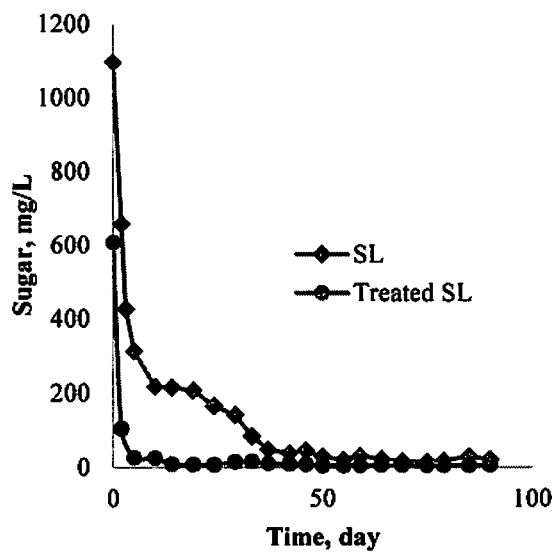
Figure 2F:
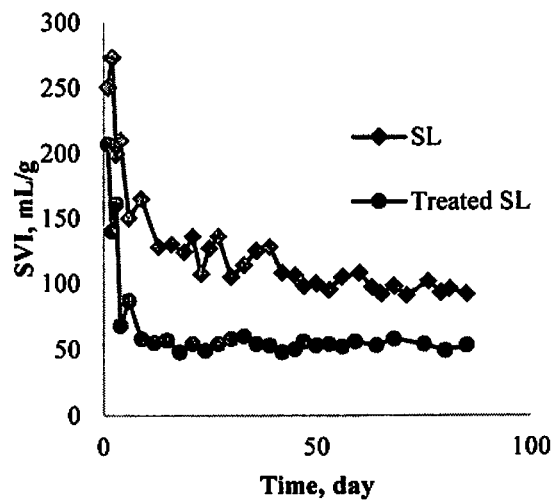
Figure 2G:
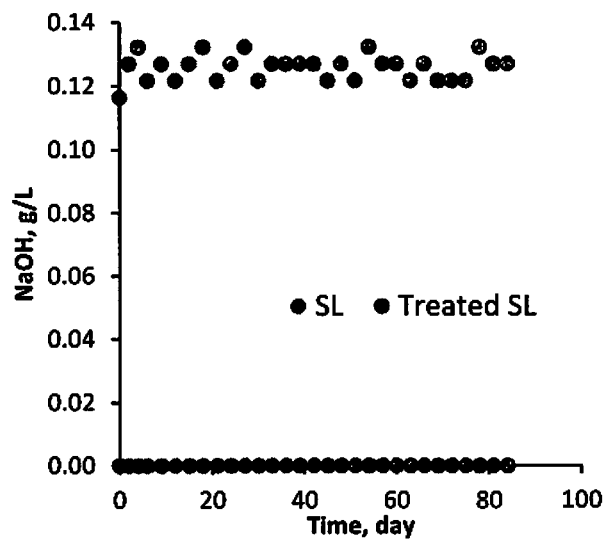
Figure 3A:
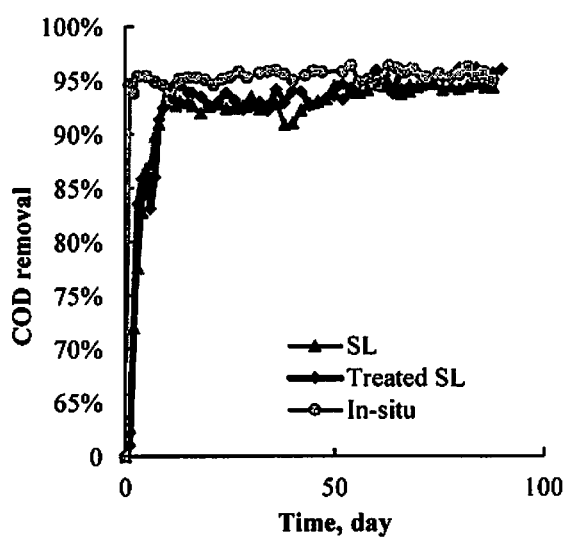
FIGS. 3A-3G graphically illustrates the effect of fly ash (0.2 wt. %) addition on the biological activities.
Figure 3B:
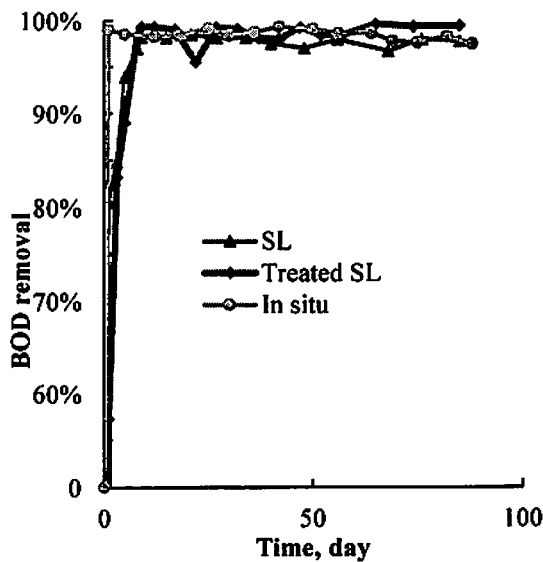
Figure 3C:
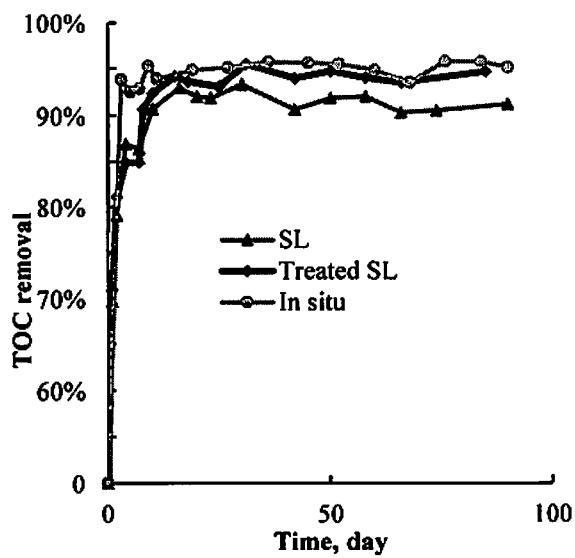
Figure 3D:
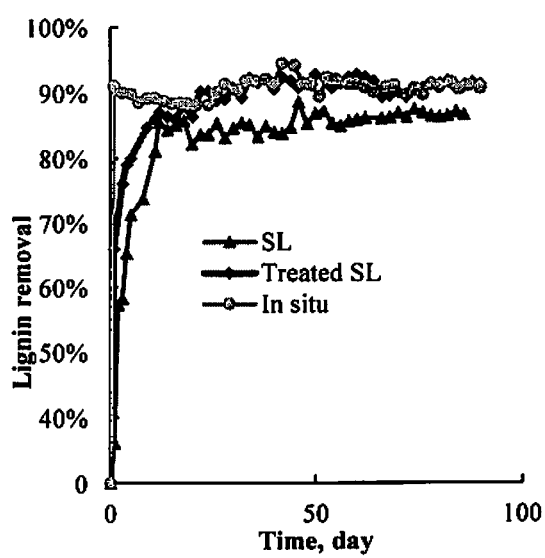
Figure 3E:
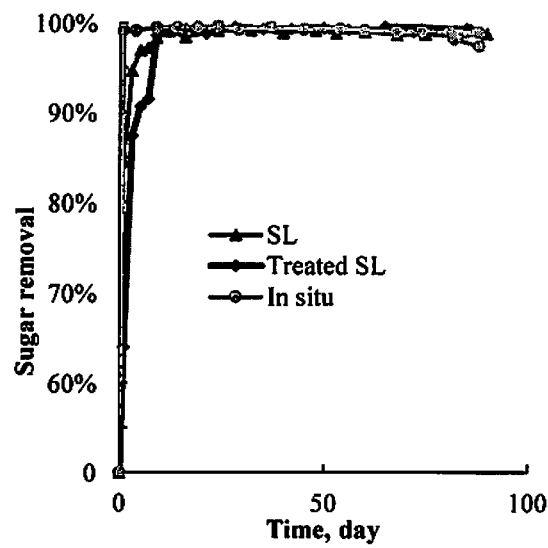
Figure 3F:
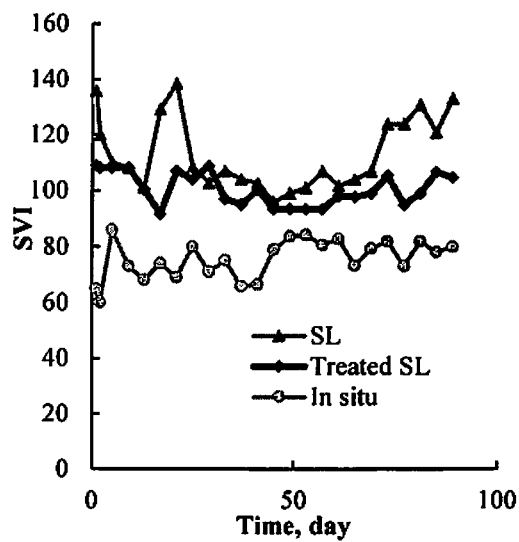
Figure 3G:
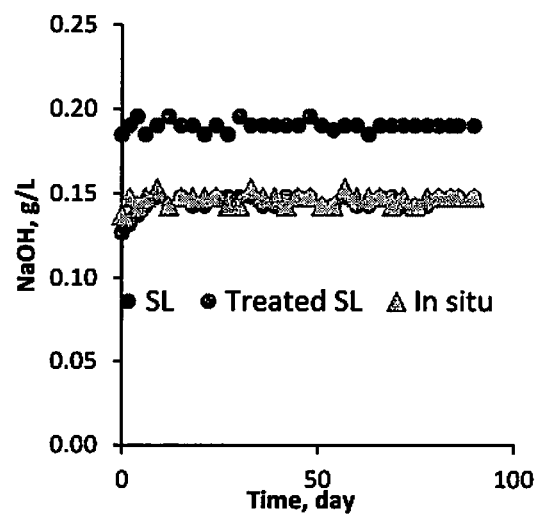

In a first embodiment schematically shown in FIG. 1B, fly ash is mixed with water so that its metals are dissolved and leached. The washed (post-leaching) fly ash can be used as an adsorbent in the biological treatment stage, landfilled or sold as an adsorbent (similar to activated carbon), while the post-leaching water containing the leached metals from the fly ash can be used for coagulating the organics of spent liquor.

Outlining the first embodiment spent liquor treatment process of FIG. 1a in more detail, the fly ash from power boiler 12 (e.g. bark boiler of a TMP process) is added to the spent liquor (e.g. from a steam heated wood chip pretreatment stage 10 of the TMP process) at an adsorption stage 14 that is situated upstream from a subsequent biological wastewater treatment stage 23. Being upstream from the final biological wastewater treatment stage, the adsorption stage is thus considered a wastewater pre-treatment stage at which the mixture of spent liquor and fly ash forms of pre-treated wastewater stream, which then enters the biological treatment process 23. In this case, there is no filtration process performed on the pre-treated wastewater to remove the fly ash from the spent liquor. After biological treatment, the fly ash is settled with sludge and thus removed from the system along with sludge. This combination of sludge and post-treatment fly ash is incinerated in the boiler 12, thus providing a fuel source to the same boiler from which the fly ash is initially sourced. Ultimately, the generated fly ash in power boiler 12 is recycled to the adsorption stage. This adsorption stage can be fed by any spent-liquor stream of the mill, or by a combination of any such streams that are sent onward to the biological treatment process.

Outlining the second embodiment spent liquor treatment process of FIG. 1B in more detail, the fly ash generated in power boiler 12 (e.g. bark boiler of a TMP process) can be washed with water in leaching stage 25, where the water leaches away metal content from the fly ash. Then, the washed (i.e. post-leaching) fly ash can be added to the liquor-containing wastewater at biological process 23, where the added fly ash acts as an adsorbent. Alternatively, the washed fly ash can simply be land filled if not utilized elsewhere in the mill, or sold as adsorbent for use in other processes or at other mills. The leachate liquor from the washed fly ash contains metals, and acts as coagulant when mixed with spent liquor at coagulation stage 14, which is situated upstream from the biological treatment stage 23. The mixing of leachate and spent liquors will lead to the coagulation of the dissolved lignocelluloses of spent liquor. The coagulated compounds can produce cake on filters, and thus be removed from the spent liquor at separation stage 16, which is situated between coagulation stage 14 and biological treatment stage 23. Situated upstream of the biological treatment stage 23, the coagulation and separation stages 14, 16 thus collectively form a spent liquor pre-treatment stage. The pre-treated spent liquor in this embodiment contains less organics but an alkaline pH. This pre-treated spent liquor can be mixed with other spent liquors available in the mill with acidic pH (e.g. from bleaching sections) or added directly to biological process 23 as a separated stream as an alkali and coagulant source to facilitate the biological process 23. The collected sludge from the biological treatment stage 23 of this system can also be sent to the boiler 12 for incineration.

Although the embodiments of FIGS. 1A and 1B source the fly ash from the power boiler of the pulp mill, other sources of fly ash may be relied upon to feed the spent liquor treatment process, including other boilers that may be employed elsewhere in the pulp mill. Use of an existing boiler of the conventional pulp mill process provides convenient on-site supply of the fly ash, and makes use of an existing byproduct of the conventional process to reduce waste.

Optionally, the fly ash and spent liquor may be mixed or agitated continually or periodically during the fly ash treatment stages (i.e. the adsorption stage 14 of the first embodiment, or the biological treatment stage 23 of the second embodiment), although the fly ash treatment is expected to be effective even in embodiments without a mixing action (in which spent liquor passes though fly ash). Alternatively, spent liquor can pass through a column containing fly ash. In this case, no mixing is required as spent liquor passes through the column of fly ash. Once fly ash is saturated with adsorbed organics, it can be taken out and sent to the boiler for burning. A new fly ash batch will be provided in the column to work. As mixing or column configuration are batch processes, to operate fly ash in these systems, the process should involve at least two of these processes in parallel, one running and one ready, standby or in a regeneration process. The fly ash treatment of the spent liquor can be conducted in a clarifier, in which case the treated fly ash may settle and be collected with sludge of the clarifier, or the treatment can be conducted in a continuous flow stirred-tank reactor (CSTR) type vessel, in which case the treated fly ash may be separated from treated spent liquor with a filter. The processes involved in the present invention can employ conventional equipment, further description of which is therefore omitted.

Having described preferred embodiments of the present invention, experimental results demonstrating the functional principles of the present invention are now summarized as follows.

1. Materials and Analyses 1.1. Materials

Fly ash was collected from a bark boiler of a pulp mill in Northern Ontario, Canada, and ground to be homogeneous. The spent liquor (SL) of a thermomechanical pulping (TMP) process was received from the same mill and used as received. Activated sludge was collected from the biological treatment process of the same mill and used as received.

1.2. Elemental Analysis

The metal content of fly ash was measured using inductively coupled plasma atomic emission spectroscopy (ICP-AES) with CETAC ASX-510 Auto Sampler (Canada). The ICP-AES analysis was conducted via using Varian Vista Pro CCD (Canada) according to the method established in the literature (13). Elemental (ultimate) analysis was performed using a Vario EL cube instrument (Germany) according to the procedure described by Fadeeva et al. (12).

1.3. Charge Density

The charge density of fly ash was determined by using Mtitek PCD04 charge detector as previously described by Oveissi et al. and Liu et al. (11, 16).

1.4. Lignin and Sugar Analyses

The lignin content of all solutions was determined by UV/Vis spectrophotometry, Genesys 10S, at the wavelength of 205 nm according to TAPPI UM 250. Calibration curves were generated and the average of three testing results was reported. To confirm that there is no interaction between fly ash and water, 2.5 g of fly ash was added to 45 g of deionized water and incubated overnight at 30° C., 100 rpm (i.e.

control sample). After separation, the filtrate was collected and its UV adsorption was scanned at the wavelength of 205 nm in order to confirm that there was no interference from fly ash in lignin analysis using UV/Vis spectrophotometry.

1.5. Turbidity, COD, TOC, BOD Analyses

The turbidity of SL samples was assessed before and after the adsorption experiments using a Hach 2100AN turbidity meter. This procedure was repeated three times and the average values were reported. The COD and BOD of the samples were determined in accordance with Standard Method 5310 of Apha 2005 (16). TOC was analyzed using Vario TOC Cube instrument (Elemental Analyzer GmbH, Germany) which is based on the oxidation of organic compounds to carbon dioxide and uses NDIR photometer for detecting $CO_2$ level. Three replicates were used for each measurement.

1.6. Molecular Weight Analysis

The samples from SL before and after treating with fly ash were filtered with a 0.2 μm nylon filter, and the filtered solutions were used for molecular weight analysis. The molecular weight was measured using a Gel Permeation Chromatography (Malvern GPC max VE2001 Module and Viscotek TDA 305). 0.1 mol/L $NaNO_3$ solutions were used as solvent at flow rate of 0.7 mL/min and poly (ethylene oxide) was used as standard samples. The temperature of the column was maintained at 30° C. The UV detector at 280 nm wavelength was used for molecular weight determination of lignin, while reflective index (RI) and intrinsic viscosity-differential pressure (IV-DP) were used for molecular weight analysis of hemicelluloses (18).

2. Experiment 1: Impact of Fly Ash Pretreatment on Biological System 2.1. Fly Ash Pretreatment Process of SL To investigate the adsorption of organics of SL on fly ash under different conditions, various amounts of fly ash were added to 50 g of SL in 125 mL Erlenmeyer flasks. Then, the flasks were sealed and stood for 5, 10, 17 and 24 h at room temperature. Afterwards, the samples were filtered using Whatman filter (No. 5) and the filtrates were collected for analyses. This set of experiments was conducted to identify the removal efficiency of fly ash for organics of SL. All tests were conducted three times and the average of the three was reported.

2.2. Sequencing Batch Reactors (SBR) Experiment

In this set of experiments, SL with and without fly ash pretreatment was treated with activated sludge. The laboratory experiments comprised of two parallel SBRs. Each reactor contained 1.2 L sludge/SL suspension. The concentration of mixed liquor suspended solids (MLSS) was intentionally controlled at a similar level of 2000 mg/L by disposing a certain amount of activated sludge per day (19). The sludge in the bioreactors was well suspended by the magnetic stirring bar at 500 rpm and continuous aeration from the bottom. The dissolved oxygen (DO) concentration in both reactors was maintained in the range of 1-7 ppm. The reactors were operated at 25° C. for about 3 months under steady state conditions. The SBRs were operated at an operational cycle length of 24 h, consisting of five stages: 10 min of feeding time, 23 h of reacting time, 40 min of settling time and 10 min of discharging time. The pH was controlled at a level of 7-8 by adding NaOH solution. Due to the low level of nutrients in the pressate and to improve the efficiency of the biological process, the COD:N:P ratio of the influent was kept at 100:5:1 by adding phosphorus as $KH_2PO_4$ and nitrogen as $NH_4Cl$ to the aeration processes (20). In order to assess the performance of the biological system; MLSS, effluent suspended solids (ESS), sludge volume index (SVI) and DO were routinely monitored every 2-3 days. The DO of the treated SL was monitored by using the HQd portable meter (Model HQ40d, Hach Company, USA). The total amount of ESS in wastewaters was determined by filtration of the wastewater through a glass fiber filter circle (Particle Retention: 1.2 μm). The MLSS were obtained by the same method (21).

2.3. Sludge Volume Index (SVI) and Solids Retention Time (SRT)

Well-mixed samples of activated sludge were removed from each reactor and subjected to setting (SVI) and flocculation analyses every 2-3 days. The SVI is defined as the volume (mL) occupied by one gram of mixed liquor suspended solids (MLSS) after 30 min of settling. In this set of experiments, about 100 mL of the sludge suspension was taken from the reactors at the end of the cyclic operation and settled for 30 min, and then SVI was calculated according to the standard method (22). The solids retention time (SRT) was calculated by dividing the volume of mixed liquor taken from reactor per day by the total volume of mixed liquor in the reactor (23).

3. Experiment 2: In Situ-Fly Ash System 3.1. Biological Processes

The biological treatment of SL was studied in sequencing batch activated sludge reactor under aerobic conditions. To investigate the effect of fly ash on the biological treatment efficiency, 3 different runs were operated in parallel in 2 L reactors containing activated sludge and wastewater mixture. Control reactor was performed with the influent of original SL. SL was pretreated with 0.2 wt. % fly ash for 10 h at room temperature, and then filtered using Whatman filter (No. 5). In the second reactor, fly ash-pretreated SL was used as influent for the biological treatment. In the third reactor, the concentration of fly ash was maintained at 0.2 wt. % in the reactor containing activated sludge and SL. Fly ash was added manually to the reactor in every operation cycle to maintain the fly ash concentrations the same level. In each comparative run, the initial conditions were identical. All of experiments were operated at 25° C. for about 3 months under steady state conditions. The aeration process was controlled using air pumps (TOPFIN AIR-500, USA) with a magnetic stirring bar at agitation intensity of 500 rpm at the bottom of the reactor. The dissolved oxygen (DO) concentration was maintained higher than 1 mg/L (24) using a DO meter (Model HQ40d, USA) and pH was controlled between 7-8 by adding NaOH solution. The system was filled with 1 L of influent daily and was operated in the following sequence of fill, react, settle and draw with respective time intervals of 10 min, 23 h, 40 min and 10 min. The concentration of mixed liquor suspended solids was adjusted to around 5000 mg/L by withdrawing a certain amount of mixed liquor per day at the end of reaction period. After setting, effluent samples were collected and analyzed for COD, BOD, TOC, sugar and lignin.

4. Experiment 3: Impact of Fly Ash Leachate on SL 4.1. Preparation of a Fly Ash Leachate Concentrate (FLC)

Fly ash samples were added to 50 g of deionized water in 250 mL Erlenmeyer flasks at a dosage of 70 mg/g fly ash/water and the flasks were sealed. The mixtures were then shaken at 100 rpm in a Boekel water bath shaker at 298 K for 2 h. The mixtures were filtered with a glass filter apparatus (Millipore) and filter paper (Whatman No. 1) and the fly ash leachate was collected. The metal content of the leachate samples was then analyzed by inductively coupled plasma-optical emission spectrometry (ICP-OES) using a Varian Vista Pro with CETAC ASX-510 Auto Sampler without pretreatment. Then, 1.25 L of the filtrate was concentrated in an oven at 378 K, which yielded a precipitate with a solid content of 7.71 g. The precipitates were then dissolved in water to a total weight of 100 g to produce FLC. The concentrations of its calcium, potassium and sodium concentrations of the FLC was determined via a mass balance. After these testes, samples were collected for lignin and COD analyses.

4.2. Coagulation Experiment

The coagulation efficiency of fly ash leachate (FLC) was monitored by a focused beam reflactance measurement, FBRM, Particle Track E25 probe (Mettler-Toledo Auto-Chem) via quantifying the chord length distribution of particles produced in the samples for 30 min at 298 K (18). In one set of experiments, the FBRM probe was immersed 20 mm below the solution level of 200 g samples of a SL in 400 mL glass beakers, and the SL was stirred at 200 rpm until steady state conditions were achieved. Then, various dosages of potassium chloride, FLC (1897-5060 mg/kg FLC/SL) was added separately. The pH was adjusted to 12.5 for the experiments.

Results and Discussion 5.1. Results of Examples 1

5.1.1. Results of Pretreating SL with Fly Ash

This experiment was performed in the sequencing batch reactor for biological treatment of SL with or without FA pretreatment. The operating conditions of the biological treatment are presented in Table 1. For SL, the alkali consumption was very high because of the high production of acid as a by-product of the biological treatment of organic materials. Treatment of effluents with this level of COD with activated sludge consumes substantial amount of energy, resulting in high treatment costs (28). In this experiment, 240 mg/L sodium hydroxide was required for maintaining the pH of SL to 7-8 in the biological reaction. The pH of post treated SL was 12.5 after pretreatment, and 0.018 v/v of sulfuric acid was used to adjust the pH of post-treated SL to 7-8 before the biological experiment. During 90 days of operation, pH of effluent was adequate for biological treatment without extra alkalinity requirement. The results of pH in the post-treated effluent showed that the lowest value of pH was 6.8 and the maximum value of pH 7.9 was observed. The pretreatment with fly ash provided an ideal pH condition for the biological reaction, which was in the range from 6.5 to 8.0 (29). Therefore, this reactor can be operated normally without any alkali supplement. Similar results were investigated by using a nonwoven fabric filter bag as the membrane bioreactor (30).

TABLE 1

The parameters of SL and post treated SL with 6 wt. % fly ash

| Parameters | Value | |
| --- | --- | --- |
| Influent | SL | Post-treated SL |
| Influent COD (mg/L) | 3448-4545 | 1082-1375 |
| MLSS (mg/L) | 2128 ± 857 | 1909 ± 661 |
| SRT (day) | 12-16 | 17-20 |
| NaOH (mg/L) | 240 | 0 |

Sludge production and removal are important factors in the operation of activated sludge systems, because the disposal of excess sludge from biological wastewater treatment processes causes lots of economic and environmental problems (31). According to many research reports, the sludge production decreased with the increasing SRT in the bioreactor system (32). In the present systems, the amount of sludge wasted from the mixed liquor was adjusted on the basis of MLSS (2000 mg/L) in the reactor and then the calculated SRT for the SL reactor (12-16 days) was lower than that for the post-treated SL reactor (17-20 days). This indicated post-treated SL system was operated with lower excess sludge production. This study confirmed that the fly ash pretreatment helped with lower excess sludge production and alkali use.

5.1.2. Performance of Biological Process

FIG. 2 shows the properties of SL and post-treated SL with fly ash in the biological process over the period of 3 months. As SL samples were received from industry over a period of 3 months, the organic compounds of the samples varied slightly. It took approximately 40 days for SL reactor (control) to reach a steady state COD removal efficiency, while it only needed 15 days for post-treated SL reactor to achieve a steady state condition. This is because fly ash pretreatment reduced the organic compounds and thus the COD of influent of the post-treated SL system, which in turn shortened the transition time to achieve steady state condition (FIG. 2). Under the steady state conditions, the effluent COD of SL and post-treated SL reactors was in the range of 300-400 and 80-120 mg/L, respectively. The residual COD results suggested the existence of non-biodegradable contaminants in the effluents. It could be seen that the fly ash treatment removed a portion of non-biodegradable components as well.

In addition, after fly ash pretreatment, the efficiency of biological treatment in BOD removal increased to 98.3%, which was higher and more stable than that of original SL (89.0%). The effluent of post-treated SL process had a BOD of 5.98 mg/L under steady state conditions achieving the proposed discharge BOD of less than 25 mg/L to the environment (33). In the present study, the food/microorganism ratio for the SL and post-treated SL systems were 0.17 and 0.13 kg BOD/kg MLSS on average, respectively, which were within the ranges reported for biological treatment system (22). Therefore, the fly ash pretreatment marginally improved the conditions for the downstream biological treatment, which in turn improved the stability and amount of BOD removal. It is seen that the concentrations of TOC in the SL and post-treated SL reactors were reduced from 1056 mg/L to 100 mg/L and from 421 mg/L to 20 mg/L after the biological treatment, respectively. The results show a high TOC removal for both systems, and more interestingly, approximately 98% of the TOC removal was observed for the post-treated SL system. Moreover, it is seen in FIG. 2 that the SL sample needed about 0.12 g per liter of SL NaOH on a daily basis to keep its pH at 7 for the biological process, but the post-treated SL with 6 wt. % fly ash did not need any NaOH for pH adjustment, which would show that a significant saving in the mass and cost of using NaOH in the biological system.

It is well known that lignin is an inhibitor of biological processes (34). As stated earlier, SL contained 2.72 g/L lignin, which would resist the biological degradation. It was earlier reported that a major part of lignin in pulp and paper mill wastewater, had a molecular weight (MW) ranging between 6 and 9 kg/mol, the fraction with 6 kg/mol had a better biodegradability (35). This analysis suggested that the biodegradability of lignin could be improved if its molecular weight was reduced. The molecular weights of lignin and sugar of SL and post-treated SL before and after biological treatment were measured (Table 2). The post-treated SL influents had a lower molecular weight for lignin and sugar than SL influents. This indicated that the FA adsorbed a portion of high molecular weight compounds and/or converted them into smaller molecular weight compounds which could improve the biodegradability of wastewater (36).

TABLE 2

Molecular weight of sugar and lignin of influent and effluent from SL and post-treated SL with 6 wt. % fly ash

| | Sugar (g/mol) | | | | Lignin (g/mol) | | | |
|---|---|---|---|---|---|---|---|---|
| | Influent | | Effluent | | Influent | | Effluent | |
| | SL | Post-treated SL | SL | Post-treated SL | SL | Post-treated SL | SL | Post-treated SL |
| Mw | 6395 | 4799 | 657 | 241 | 2647 | 1993 | 2015 | 1397 |
| Mn | 4848 | 2648 | 603 | 166 | 1786 | 827 | 1173 | 614 |
| Mw/Mn | 1.32 | 1.81 | 1.09 | 1.45 | 1.48 | 2.41 | 1.72 | 2.27 |

It is observable that the lignin and sugar content of SL effluent were 0.5 g/L and 15 mg/L, while that of post-treated SL effluent were 0.1 g/L and 5 mg/L, respectively. The results in Table 2 and FIG. 2 depicted that the concentrations and molecular weights of lignin and sugars were lower in post-treated SL than SL sample, indicating the high biodegradability and removal efficiency in post-treated SL system (37).

By comparing the data obtained in the two reactors, it is inferred that the effluent samples had a lower molecular weight than the influent samples for both reactors. This reduction is an indication of the degradation of components into smaller fraction during the biological treatment. The molecular weight decreased from 6,395 g/mol to 657 g/mol for sugar and from 2,647 g/mol to 2,015 g/mol for lignin in SL system, demonstrating that the degradation degree for sugars was higher than for lignin, which indicated that biological treatment was more selective in sugars than lignin. The degradation degree of sugar for post-treated SL reactor (molecular weight decreased from 4,799 to 241 g/mol) was higher than that for SL reactor (molecular weight decreased from 6,395 to 657 g/mol), indicating the high efficiency and selectivity of biological treatment in removing components from SL after fly ash pretreatment.

5.1.3. Sludge Performance Analysis

In conventional activated sludge processes, it required that floc agglomerates have effective settling performance for high quality effluents (38). It is known that activated sludge flocs have complex and heterogeneous compositions, and the floc characteristics could be very different depending on variations in the surrounding environments (39). It was found that the SVI level was higher for the reactor containing SL than that containing post-treated SL (FIG. 2). The results of the SVI measurements indicated that post-treated SL systems had better settling properties with SVI values below 100 mL/g MLSS than SL SBRs systems. It was reported that a settling ability of lower than 100 mL/g was beneficial for wastewater effluent system (40).

5.2. Results of Experiment 2

5.2.1. Performance of Different Biological Processes

To evaluate the effect of fly ash on activated sludge biological treatment, three systems were evaluated in parallel. One unit was operated as a conventional activated sludge unit. The second unit contained fly ash pretreated SL for biological treatment, and the third unit contained in-situ fly ash activated sludge system. The dosage of fly ash in the second and third units were the same (0.2 wt. %). The performance of activated sludge in the three systems for removing COD, BOD, TOC, sugar and lignin are shown in FIG. 3. Steady-state values were achieved in one day for the in-situ system, whereas in took 10 days for control and fly ash pretreated SL to reach stead state. It appears that the rate of removals in the in-situ system was faster than other systems. It can also be seen that the removal efficiency of COD and TOC increased slightly in the in-situ system, but control and fly ash-pretreated system behaved very similarly. The overall COD removal was 92.44%, 94.20% and 96.09% for control, fly ash pretreated and in-situ SL systems, respectively. The biodegradable organic substrate removals were investigated via BOD and sugar analyses and the results showed removals of 99.1% and 99.5%, respectively, for all three systems (FIG. 3). BOD was reduced from 999.1 mg/L to 9.1 mg/L, which is well below the discharge standard target of 25 mg/L (24).

It is observable that the systems removed at least 90% of lignin. Lignin and its derivatives are generally difficult to degrade with activated sludge system because of the strong linkages within their molecular structure, especially biphenyl-type carbon to carbon linkages (41), which was the reason for its lower removal from the systems. The inhibitory effect of lignin for biological treatment was reported in other studies (42). Tiina reported a considerably lower lignin removal (near to 50%) when wastewater from pulp and paper mill was biologically treated by the activated sludge system (43). The results also show that the fly ash pretreated and in-situ systems had more lignin removal (about 5%), which was due to the adsorption of lignin on fly ash, and thus presence of less lignin in the biological treatment systems. These results indicated that fly ash assimilation in the activated sludge treatment would benefit the removal of non-biodegradable substance (i.e. lignin) and as a result, facilitate the degradation of biodegradable organics. Moreover, it is seen in FIG. 3 that the SL in this experiment needed 0.19 g per liter of SL on a daily basis for pH adjustment during the biological process, but the use of NaOH dropped to 0.15 g per liter of treated SL for pH adjustment regardless of the pre-treatment or in-situ process. These results imply that the fly ash pretreatment will save the materials and cost of using NaOH during the biological process, and the type of the pretreatment is not determinative.

FIG. 3 also showed the variation of SVI with operation time in three systems. It can be seen that the SVI was significantly lower for the in-situ system compared to control and fly ash pretreated systems. Furthermore, there was a decrease in the SVI from 113.2 mL/g for the control system to 75.5 mL/g for the fly ash-pretreated SL system.

5.3. Results of Experiment 3

5.3.1. Leaching of Metals from Fly Ash

In this study, the biomass fly ash leachate was concentrated to produce FLC to evaluate its potential use as an alternative coagulant for SL (44). The concentration of metals leached to water via treating fly ash with water under the conditions of 70 mg/g of fly ash/water at room temperature for 2 h are listed in Table 3.

TABLE 3

Metal content of a fly ash leachate (FLC) in water (70 mg/g fly ash/water)

| Metal | Fly ash leachate mg/L | Fly ash[a] wt. % |
|---|---|---|
| Major metals | | |
| Ca | 1218.70 | 19.16 |
| K | 2415.80 | 3.82 |
| Na | 464.76 | 0.70 |
| Trace metals | | |
| Al | 0.07 | 0.94 |
| As | <MDL | <0.01 |
| Ba | 0.75 | 0.14 |
| Be | <MDL | <0.01 |
| Cd | 0.02 | <0.01 |
| Co | <MDL | <0.01 |
| Cr | <MDL | <0.01 |
| Cu | <MDL | 0.01 |
| Fe | 0.01 | 0.59 |
| Mg | 0.78 | 1.48 |
| Mn | 0.16 | 0.79 |
| Mo | <MDL | <0.01 |
| Ni | 0.05 | <0.01 |
| Pb | <MDL | <0.01 |
| Si | 0.31 | 0.09 |
| Sr | 2.14 | 0.05 |
| Ti | <MDL | 0.02 |
| V | <MDL | <0.01 |
| Zn | 2.27 | 0.19 |

MDL: minimum detection limit 5.3.2. COD and Lignin Removals

Figure 4A:
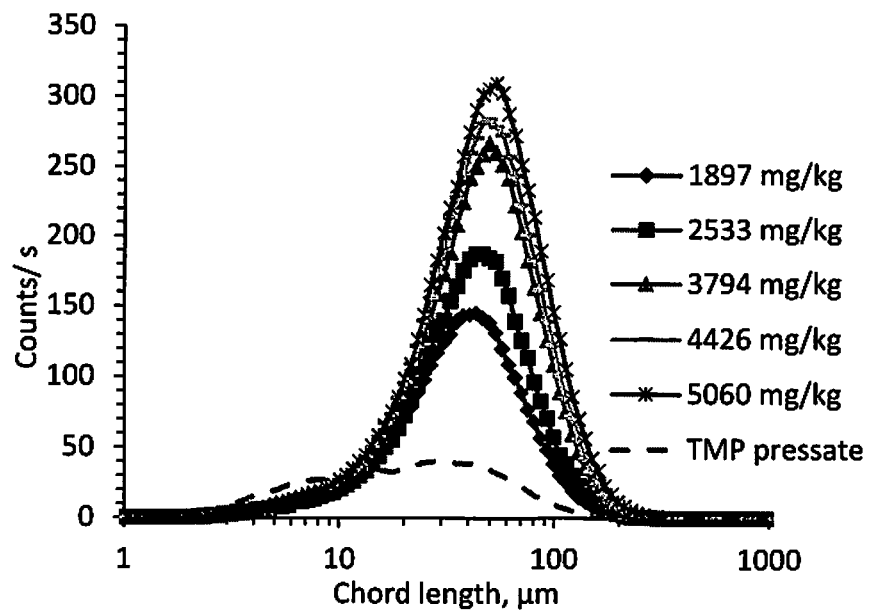
FIGS. 4A & 4B graphically illustrate the effect of fly ash leachate on the removal of lignin and chemical oxygen demand from spent liquor.
Figure 4B:
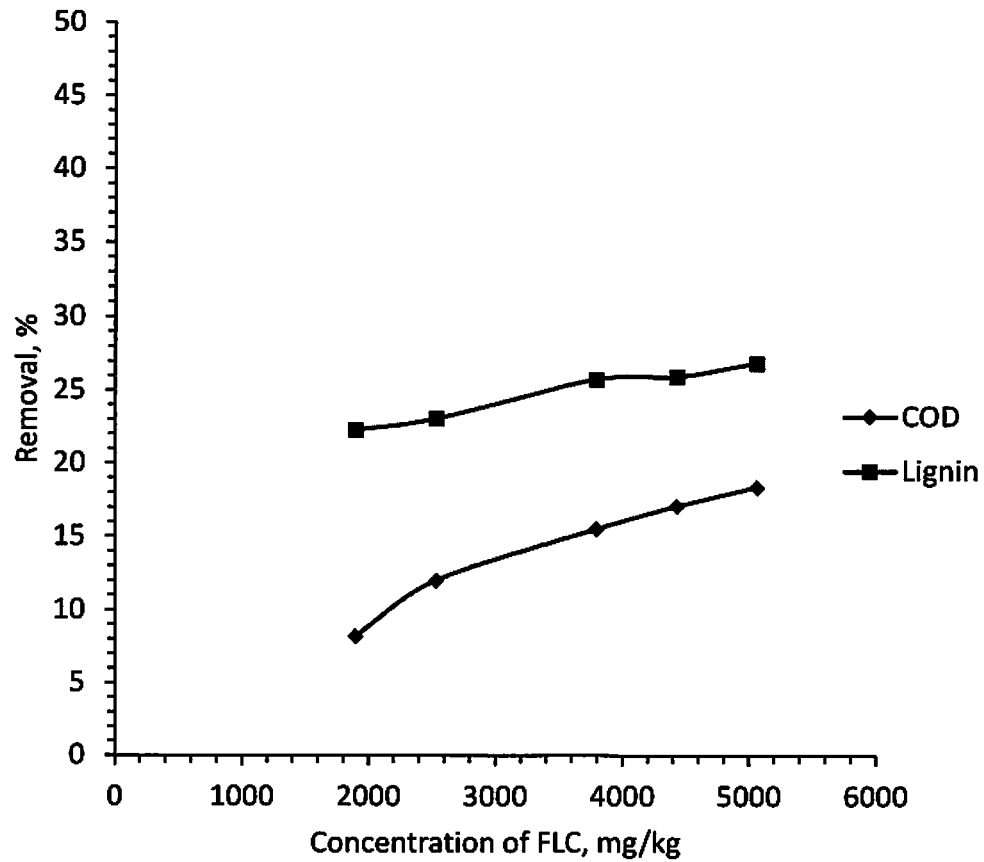

FIG. 4 shows the impact of a FLC dosage on the chord length of SL. It is seen that as the dosage of a FLC increased from 1897-5060 mg/kg FLC/SL, the total number of counts and the peak chord length increased. In FIG. 4 the impact of the FLC dosage on the COD and lignin removals from SL. The results indicate that as the dosage of the FLC increased from 1897 to 5060 mg/kg FLC/SL, the COD and lignin removals increased from 8.2% to 18.4% and from 22.3 to 26.9%, respectively, and the pH of SL was around 12 after this experiment. This analysis show that, depending on conditions of leaching process, the leachate can be used to coagulate and thus contribute to the removal of SL components.

6. Experimental Conclusions

The effect of FA pretreatment on the performance of biological treatment was investigated in this work. The results indicated that FA pretreatment remarkably improved biological removal efficiency and sludge settle ability in the biological treatment process. The flocculating ability of sludge of FA-TMP reactor was slightly poorer than that of the TMP sludge. The improved effluent quality and the reduced treatment costs supported the feasibility of applying FA pretreatment prior to biological treatment of TMP pressate.

Since various modifications can be made in the invention as herein above described, and many apparently widely different embodiments of same made within the scope of the claims without departure from such scope, it is intended that all matter contained in the accompanying specification shall be interpreted as illustrative only and not in a limiting sense.

REFERENCES (1) Sinclair, W. F., Controlling effluent discharges from Canadian pulp and paper manufacturers. Canadian Public Policy/Analyse de Politiques 1991, 86-105.
(2) Van Heiningen, A., Converting a kraft pulp mill into an integrated forest biorefinery. Pulp Paper Can. 2006, 107, 38-43.
(3) Pokhrel, D.; Viraraghavan, T., Treatment of pulp and paper mill wastewater—a review. Sci. Total Environ. 2004, 333, 37-58.
(4) Humbird, D.; Davis, R.; Tao, L.; Kinchin, C.; Hsu, D.; Aden, A.; Schoen, P.; Lukas, J.; Olthof, B.; Worley, M., Process Design and Economics for Biochemical Conversion of Lignocellulosic Biomass to Ethanol National Renewable Energy Laboratory Report NREL, TP-313, 2011, 5100-47764.
(5) Andersson, K.; Pranovich, A.; Norgren, M.; Eriksson, M.; Holmbom, B., Effects of biological treatment on the chemical structure of dissolved lignin-related substances in effluent from thermomechanical pulping. Nord. Pulp Paper Res. J 2008, 23, 164-171.
(6) Andersson, K. I.; Eriksson, M.; Norgren, M., Lignin removal by adsorption to fly ash in wastewater generated by mechanical pulping. Ind. Eng. Chem. Res. 2012, 51, 3444-3451.
(7) Yu, Y.; Park, B.; Hwang, S., Co-digestion of lignocellulosics with glucose using thermophilic acidogens. Biochem. Eng. J 2004, 18, 225-229.
(8) Liu, T.; He, Z.; Hu, H.; Ni, Y., Treatment of APMP pulping effluent based on aerobic fermentation with "*Aspergillus niger*" and post-coagulation/flocculation. Bioresour. Technol. 2011, 102, 4712-4717.
(9) Yuliani, G.; Chaffee, A. L.; Garnier, G., Biorefinery process water effluent treatments by salt coagulation. Biomass Bioenergy 2013, 56, 189-196.
(10) Zhou, Y.; Liang, Z.; Wang, Y., Decolorization and COD removal of secondary yeast wastewater effluents by coagulation using aluminum sulfate. Desalination 2008, 225, 301-311.

(11) Oveissi, F.; Fatehi, P., Isolating lignin from spent liquor of thermomechanical pulping process via adsorption. Environ. Technol. 2014, 35, 2597-2603.

(12) Fadeeva, V.; Tikhova, V.; Nikulicheva, O., Elemental analysis of organic compounds with the use of automated CHNS analyzers. J Anal. Chem. 2008, 63, 1094-1106.

(13) Yang, K.; Peng, J.; Srinivasakannan, C.; Zhang, L.; Xia, H.; Duan, X., Preparation of high surface area activated carbon from coconut shells using microwave heating. Bioresour. Technol. 2010, 101, 6163-6169.

(14) Lin, S. H.; Chang, C. C., Treatment of landfill leachate by combined electro-Fenton oxidation and sequencing batch reactor method. Water Research, 2000, 34(17), 4243-4249.

(15) Sangave, P. C.; Pandit, A. B., Ultrasound pre-treatment for enhanced biodegradability of the distillery wastewater. Ultrasonics Sonochemistry, 2004, 11(3), 197-203.

(16) Liu, Z.; Fatehi, P.; Jahan, M. S.; Ni, Y., Separation of lignocellulosic materials by combined processes of prehydrolysis and ethanol extraction. Bioresour. Technol. 2011, 102, 1264-1269.

(17) Apha, 2005. Standard Methods for the Examination of Water and Wastewater, twentiethed. American Public Health Association, American Water Works Association, Water Environmental Federation, Washington, USA., 2005.

(18) Fatehi, P; Gao, W., Sun, Y; Dashtban, M., Acidification of Acidification of prehydrolysis liquor and spent liquor of neutral sulfite semichemical pulping process. Bioresou. Technol. 2016, 218, 518-525.

(19) Wang, L. K.; Li, Y. Sequencing batch reactors. In Biological Treatment Processes. Humana Press, 2009, 459-511.

(20) Zheng, M.; Liao, B. Q., A comparative study on thermomechanical pulping pressate treatment using thermophilic and mesophilic sequencing batch reactors. Environmental Technology, 2014, 35(11), 1409-1417.

(21) Gao, W. J.; Han, M. N.; Qu, X.; Xu, C.; Liao, B. Q., Characteristics of wastewater and mixed liquor and their role in membrane fouling. Bioresource Technology, 2013, 128, 207-214.

(22) Jaidev S., Effluent treatment plant: design, operation and analysis of waste water. 2012, http://www.slideshare.net/JaidevSingh/effluent-treatment-plant-design-operation-and-analysis-of-waste-water-16567872

(23) Walker, L. F., Hydraulically controlling solids retention time in the activated sludge process. Journal of Water Pollution Control Federation, 1971, 30-39.

(24) Dong, W. Y.; Wang, H. J.; Li, W. G.; Ying, W. C.; Gan, G. H.; Yang, Y., Effect of DO on simultaneous removal of carbon and nitrogen by a membrane aeration/filtration combined bioreactor. Journal of Membrane Science, 2009, 344(1), 219-224.

(25) Furuya, K.; Miyajima, Y.; Chiba, T.; Kikuchi, T., Elemental characterization of particle size-density separated coal fly ash by spectrophotometry, ICP (inductively coupled plasma emission spectrometry), and scanning electron microscopy-energy dispersive x-ray analysis. Environ. Sci. Technol. 1987, 21, 898-903.

(26) Akgerman, A.; Zardkoohi, M., Adsorption of phenolic compounds on fly ash. J. Chem. Eng. Data 1996, 41, 185-187.

(27) Mourant, D.; Wang, Z.; He, M.; Wang, X. S.; Garcia-Perez, M.; Ling, K.; Li, C.-Z., Mallee wood fast pyrolysis: effects of alkali and alkaline earth metallic species on the yield and composition of bio-oil. Fuel 2011, 90, 2915-2922.

(28) Chen, L., Treatment of monosodium glutamate wastewater using SBR activated sludge. Journal of Chinese Textile University, 1996, 22, 79-85.

(29) Patterson, J. W. Industrial wastewater treatment technology. Butterworth Publishers, Stoneham, M A, 1985.

(30) Ren, X.; Shon, H. K.; Jang, N.; Lee, Y. G.; Bae, M.; Lee, J.; Cho, K.; Kim, I. S.; Novel membrane bioreactor (MBR) coupled with a nonwoven fabric filter for household wastewater treatment. Water Research, 2010, 44(3), 751-760.

(31) Liu, Y.; Tay, J. H., Strategy for minimization of excess sludge production from the activated sludge process. Biotechnology Advances, 2001, 19(2), 97-107.

(32) Lesage, N.; Sperandio, M.; Cabassud, C., Study of a hybrid process: Adsorption on activated carbon/membrane bioreactor for the treatment of an industrial wastewater. Chemical Engineering and Processing: Process Intensification, 2008, 47(3), 303-307.

(33) Directive, H. A. T. Council Directive of 21 May 1991 concerning urban waste water treatment. Regulation (EC), 2003, 50(284), 1. http://eur-lex.europa.eu/legal-content/EN/TXT/?uri=CELEX %3A31991L0271

(34) Pessala, P.; Schultz, E.; Luukkainen, S.; Herve, S.; Knuutinen, J.; Paasivirta, J. Lignin as the cause of acute toxicity in pulp and paper mill effluents. Pulp & Paper Mill Effluent: Environmental Fate & Effects, 2004, 319-330.

(35) Leiviskä, T.; Nurmesniemi, H.; Pöykiö, R.; Rämö, J.; Kuokkanen, T.; Pellinen, J., Effect of biological wastewater treatment on the molecular weight distribution of soluble organic compounds and on the reduction of BOD, COD and P in pulp and paper mill effluent. Water Research, 2008, 42(14), 3952-3960.

(36) Bertin, L.; Majone, M.; Di Gioia, D.; Fava, F., An aerobic fixed-phase biofilm reactor system for the degradation of the low-molecular weight aromatic compounds occurring in the effluents of anaerobic digesters treating olive mill wastewaters. J. Biotechnol., 2001, 87(2), 161-177.

(37) Bijan, L.; Mohseni, M., Integrated ozone and biotreatment of pulp mill effluent and changes in biodegradability and molecular weight distribution of organic compounds. Water Research, 2005, 39(16), 3763-3772.

(38) Forster, C. F., Factors involved in the settlement of activated sludge-I: Nutrients and surface polymers. Water Res., 1985, 19(10), 1259-1264.

(39) Wilén, B. M., Jin, B., Lant, P. Impacts of structural characteristics on activated sludge floc stability. Water Res., 2003, 37(15), 3632-3645.

(40) Von Sperling, M.; de Lemos Chernicharo, C. A., Biological wastewater treatment in warm climate regions (Vol. 1). IWA publishing, 2005

(41) Kreetachat, T.; Damrongsri, M.; Punsuwon, V.; Vaithanomsat, P.; Chiemchaisri, C.; Chomsurin, C., Effects of ozonation process on lignin-derived compounds in pulp and paper mill effluents. J. Hazard. Mat. 2007, 142(1), 250-257.

(42) Pessala, P.; Schultz, E.; Luukkainen, S.; Herve, S.; Knuutinen, J.; Paasivirta, J., Lignin as the cause of acute toxicity in pulp and paper mill effluents. Pulp & paper mill effluent: Env. Fate Effects, 2004, 319-330.

(43) Srivastava, V. C.; Mall, I. D.; Mishra, I. M. Treatment of pulp and paper mill wastewaters with poly alominium chloride and baggase fly ash, Colloid Surf. A. Physicochem. Eng. Asc., 2005, 260, 17-28.

The invention claimed is:

1. A method of treating spent liquor from a pulping process of a pulp mill, said method comprising obtaining leachate from a leaching stage at which biomass-based fly ash from a bark boiler of a thermomechanical pulping process is subjected to a leaching process in a pH neutral water bath to remove metal contents from said biomass-based fly ash, and applying said leachate to the spent liquor as a coagulant at a pre-treatment stage upstream from a biological wastewater treatment stage to which the pre-treated spent liquor is subsequently subjected.

2. The method of claim 1 comprising separating coagulates from the spent liquor at a separation stage between the pre-treatment stage and the biological wastewater treatment stage.

3. The method of claim 2 comprising using the coagulates from the spent liquor as a boiler fuel source.

4. The method of claim 3 comprising using the coagulates as the boiler fuel source at the same bark boiler from which the biomass-based fly ash is originally sourced.

5. The method of claim 1 comprising adding the biomass-based fly ash from the leaching stage to the spent liquor for use as an adsorbent in the biological wastewater treatment stage.

6. The method of claim 1 wherein the spent liquor is sourced from a steam pretreatment stage of the thermomechanical pulping process.

* * * * *